(12) United States Patent
Brusilovsky et al.

(10) Patent No.: US 8,179,860 B2
(45) Date of Patent: May 15, 2012

(54) SYSTEMS AND METHOD FOR PERFORMING HANDOVERS, OR KEY MANAGEMENT WHILE PERFORMING HANDOVERS IN A WIRELESS COMMUNICATION SYSTEM

(75) Inventors: Alec Brusilovsky, Naperville, IL (US); Tania Godard, Boulogne-Billancourt (FR); Sarvar Patel, Montville, NJ (US)

(73) Assignee: Alcatel Lucent, Paris (FR)

( * ) Notice: Subject to any disclaimer, the term of this patent is extended or adjusted under 35 U.S.C. 154(b) by 409 days.

(21) Appl. No.: 12/378,653

(22) Filed: Feb. 18, 2009

(65) Prior Publication Data
US 2009/0220087 A1    Sep. 3, 2009

Related U.S. Application Data

(63) Continuation-in-part of application No. 12/071,098, filed on Feb. 15, 2008.

(51) Int. Cl.
  H04W 4/00    (2009.01)
  H04L 9/08    (2006.01)
  H04L 29/06   (2006.01)
  G06F 7/04    (2006.01)
  G06F 15/16   (2006.01)
  G06F 17/30   (2006.01)

(52) U.S. Cl. .................. 370/331; 455/432.1; 380/278; 726/9

(58) Field of Classification Search ............ 370/331
   See application file for complete search history.

(56) References Cited

U.S. PATENT DOCUMENTS

| 6,771,776 | B1 * | 8/2004 | Rose .................. 380/272 |
| 6,876,747 | B1 * | 4/2005 | Faccin et al. .......... 380/247 |
| 2004/0228491 | A1 * | 11/2004 | Wu .................. 380/272 |
| 2005/0124344 | A1 * | 6/2005 | Laroia et al. .......... 455/436 |
| 2007/0060127 | A1 * | 3/2007 | Forsberg .............. 455/436 |
| 2007/0171871 | A1 * | 7/2007 | Forsberg .............. 370/331 |
| 2007/0224986 | A1  | 9/2007 | Bakshi et al. .......... 455/436 |
| 2007/0224993 | A1 * | 9/2007 | Forsberg .............. 455/436 |
| 2008/0089294 | A1 * | 4/2008 | Shon et al. ........... 370/331 |
| 2008/0101400 | A1 * | 5/2008 | Auterinen ............. 370/463 |
| 2008/0188223 | A1 * | 8/2008 | Vesterinen et al. ...... 455/436 |
| 2008/0318576 | A1 * | 12/2008 | So et al. ............. 455/436 |
| 2009/0061878 | A1 * | 3/2009 | Fischer .............. 455/436 |
| 2009/0124259 | A1 * | 5/2009 | Attar et al. ........... 455/436 |

FOREIGN PATENT DOCUMENTS
WO  PCT/US2009/001092    6/2009

OTHER PUBLICATIONS

Alcatel-Lucent: "Key refresh at Intra-MME handovers", 3GPP DRAFT; S3-080107—Proposal for the Key Refresh on Ho Procedures V.5, 3rd Generation Partnership Project (3GPP), Mobile Competence Centre; 650, Route Des Lucioles; F-06921 Sophia-Antipolis Cedex, France, vol. SA WG3, No. Sanya 20080225, Feb. 16, 2008, the whole document.

(Continued)

*Primary Examiner* — Andrew Chriss
(74) *Attorney, Agent, or Firm* — Harness, Dickey & Pierce, P.L.C.

(57) ABSTRACT

Example embodiments provide a method for performing handovers and key management while performing handovers. The method includes communicating a random handover seed key protected by a secure protocol from a core component of a network to a user equipment. The secure protocol prevents the random handover seed key from being learned by base stations supported by the core component of the network. The secure protocol may be non-access stratum signaling of an evolved packet system environment for wireless communications.

12 Claims, 5 Drawing Sheets

OTHER PUBLICATIONS

Nokia: "Nokia's Solution on SAE Security (Doc. Name: S3-050721)", Internet Citation, [Online] Retrieved from the Internet: URL:http://www.3gpp.org/ftp/tsg_saWG3_Security/TSGS3_41_SanDiego/Docs/S3050721.zip>, Nov. 8, 2005, 17 pgs.

Samsung Electronics: "LTE Security Architecture", 3GPP TSG SA WG3 Security-SA#41, Nov. 7, 2005, 7 pgs.

* cited by examiner

SYSTEMS AND METHOD FOR PERFORMING HANDOVERS, OR KEY MANAGEMENT WHILE PERFORMING HANDOVERS IN A WIRELESS COMMUNICATION SYSTEM

RELATED APPLICATION

This application is a continuation in part of U.S. patent application Ser. No. 12/071,098, filed Feb. 15, 2008, published Aug. 20, 2009 as U.S. Published application Ser. No. 2009/0209259, the subject matter thereof being fully incorporated herein by reference. This application further claims priority pursuant to 35 U.S.C. Sec 119(e) to U.S. Provisional Application No. 61/066,437, filed Feb. 20, 2008, entitled SYSTEM AND METHOD FOR PERFORMING HANDOVERS, OR KEY MANAGEMENT WHILE PERFORMING HANDOVERS IN A WIRELESS COMMUNICATION SYSTEM, the subject matter thereof being fully incorporated herein by reference.

FIELD OF THE INVENTION

Example embodiments of the present application relate to a system and method for telecommunications. More particularly, example embodiments relate to a method of providing secure wireless communication between a network and user equipment using secure keys.

BACKGROUND INFORMATION

Security methods and processes relating to wireless communications are evolving. For example, the 3rd Generation Partnership Project (3GPP), which is a collaboration between various groups of telecommunications associations, is currently working on developing security protocols applicable to wireless communications within an enhanced packet system (EPS).

FIG. 1 illustrates an example of an EPS environment for wireless communications. The EPS of FIG. 1 illustrates a user equipment (UE), evolved NodeBs (eNBs) and a mobility management entity (MME). FIG. 1 also illustrates that the eNBs and the MMEs are part of the evolved UMTS terrestrial radio access network (eUTRAN) indicated by the solid-line oval, while the UE is outside of the eUTRAN. Further, the MME is included in the evolved packet core (EPC) of the EPS environment shown in FIG. 1. The EPC is identified by the thin dashed-line oval.

Generally, an EPS has two layers of protection instead of one layer perimeter security as is used in universal mobile telecommunications system (UMTS). The first security layer is the evolved UMTS Terrestrial Radio Access Network (eUTRAN), and the second security layer is evolved Packet Core (EPC) network security. Evolved Packet Core security involves the use of non-access stratum (NAS) signaling security.

A conventional example of security of an EPS environment is now discussed with respect to the signaling diagram illustrated in FIG. 2.

The signaling diagram of FIG. 2 illustrates messages communicated between and operations of a user equipment (UE), first evolved NodeB (source eNB), second evolved NodeB (target eNB), and an evolved packet core (EPC). The EPC includes a Mobility Management Entity (MME) and system architecture evolution gateway (SAE GW). Specifically, the conventional signaling diagram of FIG. 2 illustrates communication between these various components during an intra-MME handover. An intra-MME handover refers to a handover of a UE from a source eNB to a target eNB, in which both the source eNB and target eNB are supported by the same MME.

Referring to FIG. 2, the UE sends a measurement report to the source eNB in message 1. The contents of the measurement report are well-known in the art and thus, are not discussed herein for the sake of brevity.

In response to receiving the measurement report, the source eNB determines which target eNB to conduct the handover procedure with. To begin this conventional handover, the source eNB derives a second key KeNB* from a first key KeNB that is known at the source eNB as shown by operation 1A. Once the second key KeNB* is derived by the source eNB, the source eNB sends a handover request to the target eNB along with the second key KeNB* in message 2.

In response to receiving the handover request, the target eNB provides a handover response to the source eNB along with a Cell Radio Temporary Identity (C-RNTI) in message 3. Conventionally, this C-RNTI is a 16 bit or 32 bit number. Further, this C-RNTI may simply be an identifier related to the target eNB. In the conventional signal diagram of FIG. 2, the second key KeNB* and C-RNTI are being relied on for security. As shown by operation 3A, the target eNB also derives a third key KeNB** from the KeNB* and the C-RNTI. Further, Radio Resource Control and User Plane (RRC/UP) keys are derived from the third key keNB by the target eNB in operation 3B** as is well known in the art.

Still referring to FIG. 2, the source eNB in response to receiving the handover response in message 3, transmits a handover command to the UE. The handover command instructs the UE to perform a handover with the target eNB as shown by Message 4.

Once the UE receive the handover command of message 4, the UE derives a third key KeNB** from the KeNB* and the C-RNTI in operation 4A, which is the same as the key derived in operation 3A by the target eNB. From the third key KeNB, the UE derives RRC/UP keys as is well-known in the art as shown by operation 4B. As such, both the UE and target eNB have the RRC/UP keys. The UE then sends a handover confirm message to the target eNB as indicated by message 5**.

In response to receiving the handover confirm message from the UE, the target eNB sends a handover complete message to the source eNB indicating the intra-MME handover is complete in message 6. Lastly, as indicated by message 7, the target eNB, which is now the source eNB sends a UE location update message to the EPC.

SUMMARY OF INVENTION

Example embodiments provide a method of providing secure wireless communication between a network and user equipment using secure keys. In particular, example embodiments provide a method for performing handovers and key management while providing increased security.

An example embodiment provides a method performed by user equipment. The method includes receiving a random handover seed key protected by a secure protocol from a core component of a network such as a MME. The secure protocol prevents the random handover seed key from being learned by base stations (e.g., eNBs) supported by the core component of the network. The method also includes receiving a handover command from a source base station. The handover command includes a target base station identifier identifying a target base station. The target base station is a base station targeted to provide services to a user equipment that is supported by the source base station. The method also includes deriving encryption keys using the received random handover seed key and the target base station identifier, and communicating with the target base station based on the derived encryption keys and the target base station identifier.

According to an example embodiment, the method performed by the user equipment further includes sending a confirmation message to the target base station to confirm handover from the source base station to the target base station is acceptable.

According to an example embodiment, the method performed by the user equipment further includes sending a measurement report to the source base station. Further, the receiving step may receive the handover command from the source base station in response to the sent measurement report.

According to an example embodiment, in the method performed by the user equipment, the deriving step may input the random handover seed key and the target base station identifier as inputs to a key derivation function to derive the encryption keys.

According to an example embodiment, the secure protocol is a non-access stratum (NAS) protocol.

Another example embodiment provides a method performed by a core component (e.g., MME) of the network. The method includes sending a random handover seed key from the core component of a network to a user equipment using a secure protocol that prevents the random handover seed key from being learned by base stations supported by the core network component.

According to the example embodiment, the method performed by the core component of the network further includes assigning a first random key at the core component of a network to each base station supported by the core component, and providing the first random key to each of the respective base stations. The first random key is different for each base station and is provided prior to sending the random handover seed key to the user equipment.

According to the example embodiment of the method performed by the core component of the network, the providing step may provide the first random key to each of the respective base stations prior to a handover procedure involving the respective base stations.

According to the example embodiment, the method performed by the core component further includes receiving a list of potential handover target base stations for the user equipment from a source base station currently supporting the user equipment, selecting the random handover seed key, deriving a second random key specific for each target base station listed in the list of potential handover target base stations by using the random handover seed key and respective target base station identifiers as inputs to a key derivation function (e.g., AES). Still further, the method includes encrypting each second random key with the corresponding first random key to obtain an encrypted second random key for each target base station listed in the list of potential handover target base stations, and sending a list of the encrypted second random keys to the source base station.

Another example embodiment provides a method performed by base station. The method performed by a base station includes sending a list identifying potential handover target base stations for a user equipment to a core component to request information for each of the potential handover target base stations included in the list, and receiving a list of encrypted first random keys. Each of the encrypted first random keys is specific to one of the potential handover target base stations.

According to the example embodiment, a random handover seed key protected by a secure protocol is sent from a core component of a network to the user equipment. The secure protocol prevents the random handover seed key from being learned by a source base station currently supporting the user equipment and the potential handover target base stations supported by the core component of the network.

According to the example embodiment, the method performed by a base station further includes receiving a measurement report from the user equipment, selecting one of the potential handover target base stations as a target base station to support the user equipment following a successful handover, and forwarding a handover request to the target base station. The handover request includes the encrypted first random key corresponding to the selected target. Still further, the method includes sending a handover command to the user equipment, receiving a handover complete signal from the target base station, and handing over support of the user equipment to the target base station in response to receiving the handover complete signal.

Still another example embodiment provides a method performed by a base station. The method includes receiving a first random key from a core component of a network including a plurality of base stations one of which is a source base station supporting a user equipment and another of which is a target base station for supporting the user equipment after handover. The method also includes receiving a handover request including an encrypted first random key at the target base station, decrypting the handover request using the first random key to recover a second random key, deriving encryption keys from the second random key at the target base station, and communicating with the user equipment based on the derived encryption keys.

According to the example embodiment, the first random key is received prior to a handover procedure started by receiving the handover request.

According to the example embodiment, a random handover seed key protected by a secure protocol is sent from the core component of the network to the user equipment. The secure protocol prevents the random handover seed key from being learned by the source base station currently supporting the user equipment and the target base station supported by the core component of the network.

BRIEF DESCRIPTION OF THE DRAWINGS

The above and other features and advantages of example embodiments will become more apparent by reviewing the following detailed description of example embodiments of this disclosure with reference to the attached drawings in which.

DETAILED DESCRIPTION OF EXAMPLE EMBODIMENTS

In the following description, for purposes of explanation and not limitation, specific details are set forth such as particular architectures, interfaces, techniques, etc., in order to provide a thorough understanding of example embodiments. However, it will be apparent to those skilled in the art that example embodiments may be practiced in other illustrative embodiments that depart from these specific details. In some instances, detailed descriptions of well-known devices, circuits, and methods are omitted so as not to obscure the description of example embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing radio network control nodes.

In the following description, illustrative embodiments will be described with reference to acts and symbolic representations of operations (e.g., in the form of signaling diagrams) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, user equipment and/or access network, which reconfigures or otherwise alters the operation of the computer, user equipment and/or access network in a manner well understood by those skilled in the art.

Figure 1:
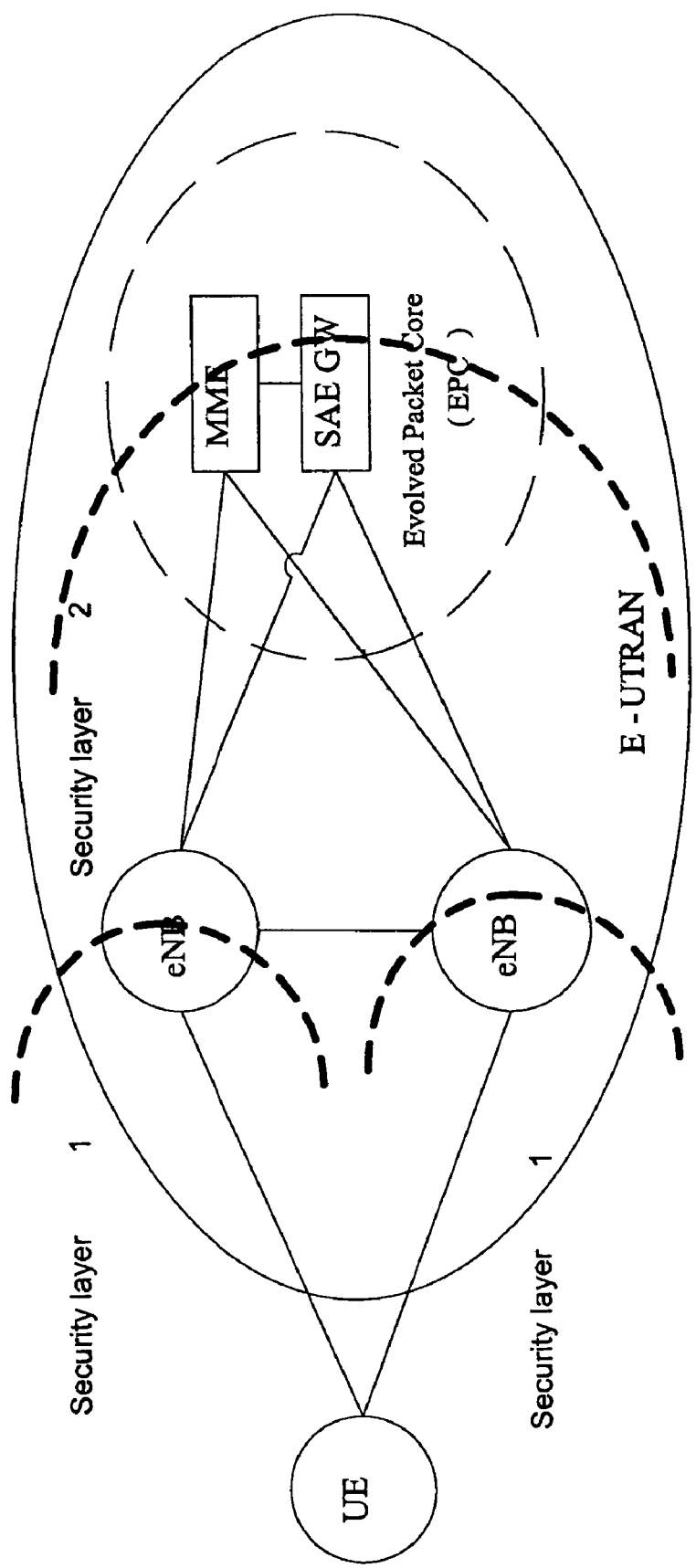
FIG. 1 illustrates a EPS environment for wireless communications; illustrates a signal flow diagram of message and operations performed in a conventional Intra-MME handover procedure.

An example embodiment of a method for performing handovers as well as key management in a wireless communication system is explained below with respect to the signal flow diagram illustrated in FIG. 3. One skilled in the art will appreciate that the method explained below may be implemented in an EPS environment for wireless communication such as that shown in FIG. 1. In particular, the example embodiments described below leverage use of NAS signaling security of an EPS. The NAS security essentially provides a tunnel between the UE and the MME, which is transparent to the eNBs. In particular, the NAS security tunnel cannot be read and/or decoded by the eNBs according to example embodiments.

Figure 3:
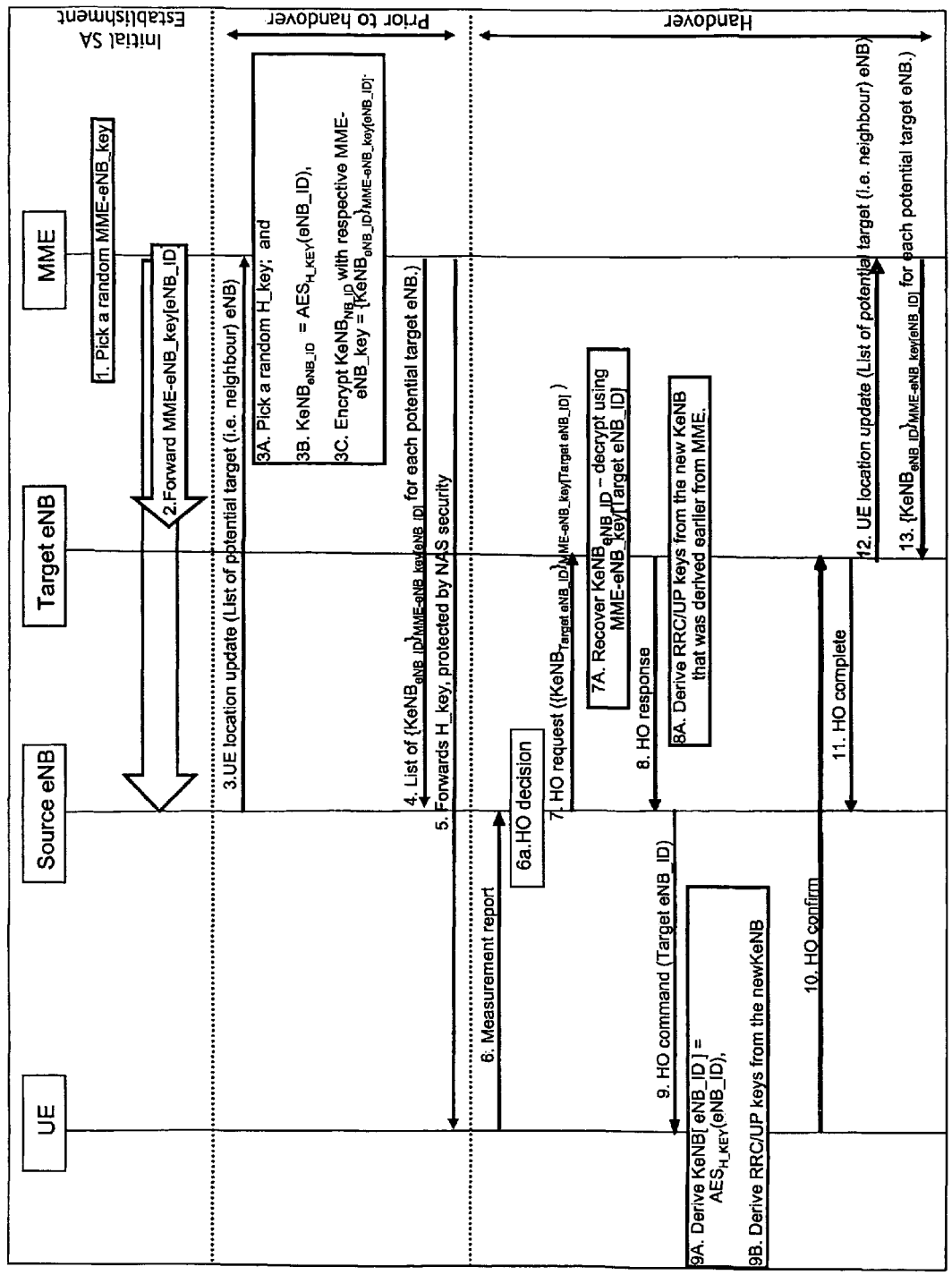
FIG. 3 illustrates a signal flow diagram for messages and operations of a Intra-MME handover procedure according to an example embodiment.

FIG. 3 illustrates an example embodiment of an MME-assisted key refresh procedure for intra-MME handovers. In particular, the signaling diagram of FIG. 3 shows message exchanges between and operations performed by a UE, a source eNB, a target eNB and the MME of the EPS previously described with respect to FIG. 1. The signaling diagram of FIG. 3 also identifies three different groupings of the messages and operations including the initial security association (SA) establishment messages and operations, messages and operations performed prior to handover, and handover messages and operations.

Referring to FIG. 3, the MME generates an eNB random key MME-eNB_key [eNB_ID] for each of the eNBs of the EPS in operation 1. The number of bits of this random key may vary. According to examples described herein, each eNB random key MME-eNB_key[eNB_ID] is 128 or 256 bits long, matches the length of the serving system keys (128 or 256 bits), and is specific to a corresponding eNB. In the initial security establishment phase, the eNB and MME have a security association established, only afterwards do they try to agree on a MME-eNB_Key. This happens to each eNB, perhaps after it has booted up and established a security association. It is noted that there is no waiting for an eNB to become a source or target eNB in a handover. The MME-eNB key is established independent of handovers. Further, the MME-eNB key may be refreshed after some period.

As indicated by message 2, the MME sends a different eNB random key MME-eNB_key[eNB_ID] to each of the target eNBs connected to the MME via a S1 interface. The source eNB is the eNB currently providing wireless communication services to the UE. Prior to handover, a UE location update message is sent from the source eNB to the MME as indicated by message 3. The UE location update message includes a list of eNBs to which wireless communication services for the UE may be handed over from the source eNB. Stated differently, the location update message includes a list of neighbor eNBs that is transmitted from the source eNB to the MME.

Still referring to FIG. 3, the MME selects and/or creates a random handover seed key H_key as indicated by operation 3A. According to example embodiments, the random handover seed key H_key is unknown to the eNBs of the EPS. In operation 3B, the MME uses an identifier eNB ID individually identifying each of the eNBs of the system as an input to a key derivation function along with the random handover seed key H_key to create a first key $KeNB_{eNB\_ID}$ for each target eNB in the received neighbor list. For example, the key derivation function is an AES and thus, the first key for an eNB is represented as follows: $KeNB_{eNB\_ID}=AES_{H\_key}$(eNB_ID). Further, the MME then encrypts the calculated first key $KeNB_{eNB\_ID}$ with the respective eNB random keys MME-eNB_key[$eNB\_ID_{Target}$] of the target eNBs in operation 3C to obtain an encrypted first key $\{KeNB_{eNB\_ID}\}_{MME\text{-}eNB\_key[eNB\_ID]}$. The notation $\{X\}_Y$ designates the encryption of X using the key Y. The encryption of the key should be semantically secure encryption. For example a 128 bit key could be encrypted by using it as input to a 128 bit AES block cipher and using MME-eNB_key as the AES key. Another option is to use any form of encryption, but supplement with a message integrity tag. An encrypted first key $\{KeNB_{eNB\_ID}\}_{MME\text{-}eNB\_key[eNB\_ID]}$ is obtained for each of the potential target eNBs identified in the UE location update message sent from the source eNB to the MME in message 3.

Once the MME obtains the encrypted first keys $\{KeNB_{eNB\_ID}\}_{MME\text{-}eNB\_key[eNB\_ID]}$ for each of the potential target eNBs, the encrypted first keys $\{KeNB_{eNB\_ID}\}_{MME\text{-}eNB\_key[eNB\_ID]}$ are provided to the source eNB as indicated by message 4. Stated differently, the MME sends an array or list of obtained encrypted first keys $\{KeNB_{eNB\_ID}\}_{MME\text{-}eNB\_key[eNB\_ID]}$ for the potential target eNBs. Each element of that array corresponds to a potential target eNB and is indexed by the identifier eNB_ID. Thus, according to example embodiments, the keys provided to the source eNB in response to receiving the UE location update message are encrypted, specific to the different potential target eNBs, and generated based on the random handover seed key H_key.

Referring to FIG. 3, the MME forwards the random handover seed key H_key selected in operation 3A to the UE in message 5. According to example embodiments, the forwarding of the H_key is protected by a NAS security. It is noted that at any initial and/or subsequent authentication using Authentication Key Agreement (AKA), the UE and MME create security contexts, including NAS encryption and NAS integrity keys. When messages pass through one or more eNBs over the air interface to the UE, eNBs cannot see the content of the NAS messages since neither the MME nor the UE share NAS keys with eNBs. As such, the random handover seed key H_key cannot be eavesdropped by either the source eNB or target eNB during the transmission of message 5. Stated differently, the random handover seed key H_key is protected by NAS security to prevent the eNBs supported by the MME from learning the random handover seed key H_key. Accordingly, even if an attacker has control over the source eNB, the attacker is inhibited and/or prevented from obtaining the random handover seed key H_key.

Once the message exchanges 1-5 and operations 1 and 3A-3B described above are completed, an example embodiment of a handover procedure for handing over the UE from the source eNB to a target eNB is performed as detailed below.

Still referring to FIG. 3, the UE sends a measurement report to the source eNB as indicated by message 6. As described in the background section with respect to FIG. 1, the measurement report is well-known in the art and thus, is not described herein for the sake of brevity. In response to receiving the measurement report, the source eNB makes a handover decision for the UE as indicated in operation 6a. As such, the source eNB determines which target eNB will provide communication services to the UE following the handover procedure. Once the handover decision is made by the source eNB, the source eNB sends a handover request to the target eNB. The handover request includes the encrypted first key $\{KeNB_{Target\ eNB\_ID}\}_{MME-eNB\_key[Target\ eNB\_ID]}$ corresponding to the target eNB as shown by message 7.

Figure 2:
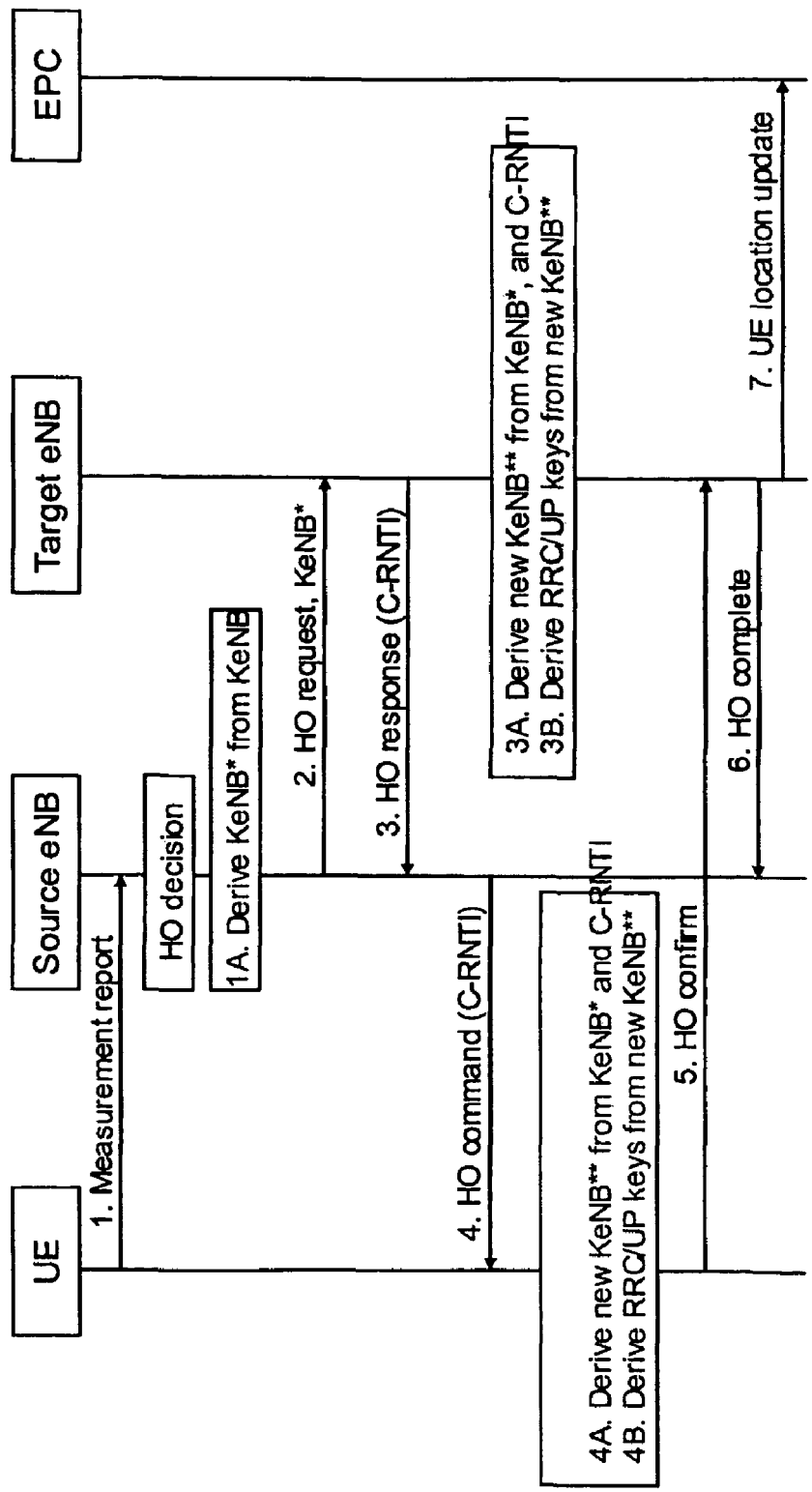
FIG. 2 illustrates a signal flow diagram of message and operations performed in a conventional intra-MME handover procedure.

As previously described with respect to message 4, the MME sends an array or list of obtained encrypted first keys $\{KeNB_{eNB\_ID}\}_{MME-eNB\_key[eNB\_ID]}$ for the potential target eNBs. Each element of that array corresponds to a potential target eNB and is indexed by the identifier eNB_ID. As such, when the source eNB knows the target eNB identifier Target eNB_ID, the source eNB forwards the encrypted KeNB for the identified target eNB to the target eNB. The encrypted first key $\{KeNB_{Target\ eNB\_ID}\}_{MME-eNB\_key[Target\ eNB\_ID]}$ is sent to the target eNB according to example embodiment, as compared with merely sending a handover request including the second key KeNB* derived with a one-way function from the first KeNB as described in the conventional method of FIG. 2.

Referring to operation 7A of FIG. 3, the target eNB recovers first key $KeNB_{eNB\_ID}$ for the target eNB by decrypting the encrypted first key value $\{KeNB_{Target\ eNB\_ID}\}_{MME-eNB\_key[Target\ eNB\_ID]}$ using the key MME-eNB_key[Target eNB_ID$_{Target}$] previously sent to the target eNB from the MME in message 2. The target eNB sends a handover response to the source eNB in message 8. Further, the target eNB derives RRC/UP keys from the decrypted first key value $KeNB_{Target\ eNB\_ID}$ in operation 8A.

As indicated by message 9, the source eNB sends a handover command to the UE. The handover command of message 9 makes the target eNB known to the UE by including an identifier Target eNB_ID of the target eNB. As previously discussed, the UE has already received the random handover seed key H_Key. Accordingly, the UE derives the first key for the target eNB $KeNB_{Target\ eNB\_ID}$ in operation 9A. An equation for deriving the first key for the target eNB is as follows: $KeNB_{Target\ eNB\_ID} = AES_{H\_key}(Target\ eNB\_ID)$. From the obtained first key for the target eNB $KeNB_{Taget\ eNB\_ID}$, the UE derives RRC/UP keys in operation 9B. Derivation of the RRC/UP keys are well-known in the art and thus, are not discussed herein for the sake of brevity.

Still referring to FIG. 3, the UE sends a handover confirm message to the target eNB as shown by message 10. The target eNB receives the handover confirm message from the UE and notifies the source eNB that the handover is complete. The target eNB notifies the source eNB by transmitting a handover complete signal in message 10.

Once the handover procedure is complete, the target eNB, which is now the second source eNB for the UE, sends a UE location update message with a list of potential targets, i.e., neighbor eNBs, to the MME in order to prepare for a possible second handover in message 12. As such, message 12 is similar to message 3, which was sent from the first source eNB to the MME prior to the handover from the first source eNB to the target eNB. Message 13 is similar to previously described message 4 for the same reasons. In particular, the MME again obtains encrypted first keys $\{KeNB_{eNB\_ID}\}_{MME-eNB\_key[eNB\_ID]}$ for each of the potential target eNBs, and the encrypted first keys $\{KeNB_{eNB\_ID}\}_{MME-eNB\_key[eNB\_ID]}$ are provided to the source eNB in message 13

Figure 4:
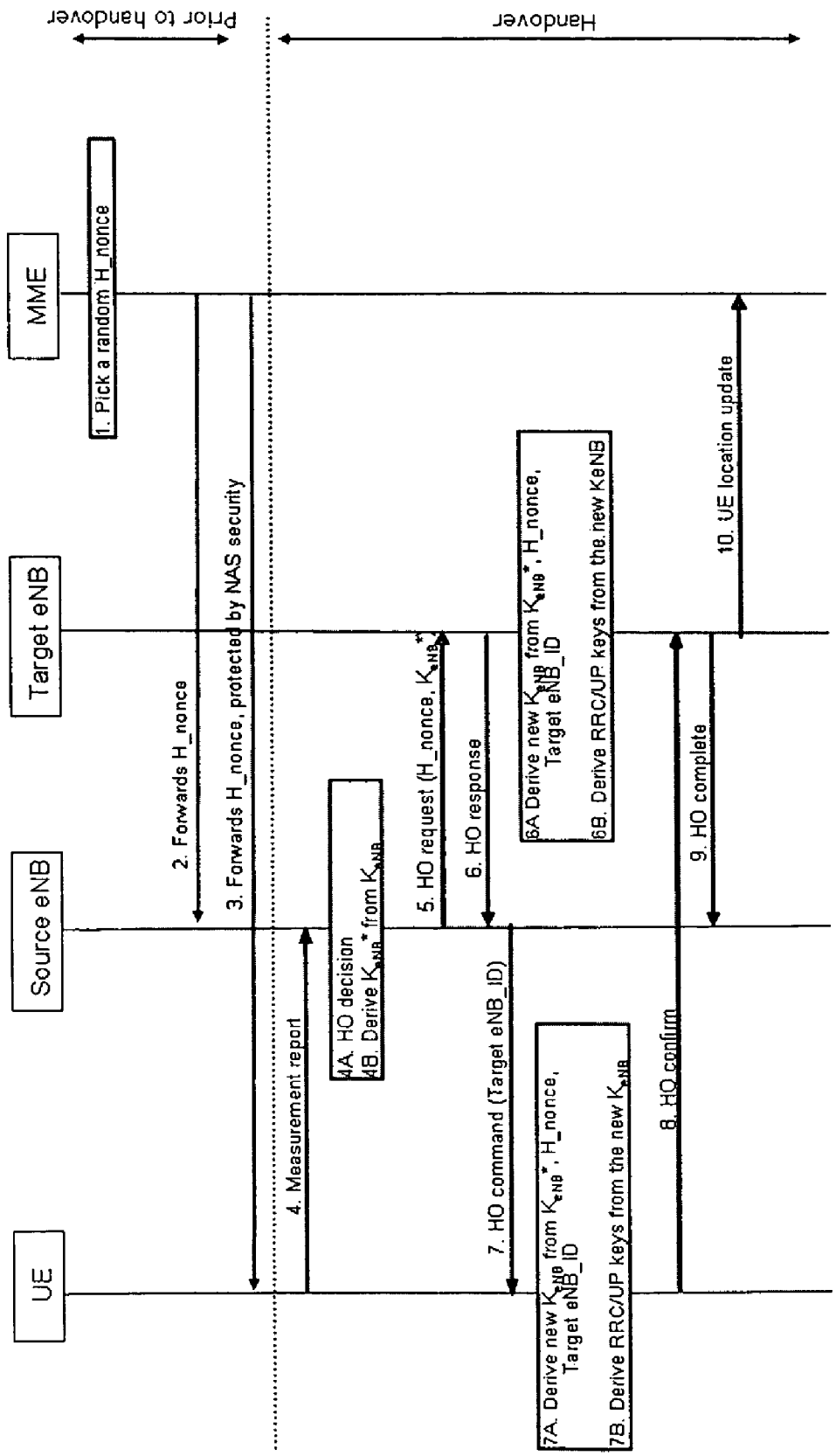
FIG. 4 illustrates a signal flow diagram for messages and operations of a Intra-MME handover procedure according to an alternative embodiment.

An alternative handover procedure is illustrated in FIG. 4. As with the embodiment described in conjunction with FIG. 3, the signaling diagram of FIG. 4 illustrates an alternative embodiment of an MME-assisted key refresh procedure for intra-MME handovers. In particular, the signaling diagram of FIG. 4 shows message exchanges between and operations performed by a UE, a source eNB, a target eNB and the MME of the EPS previously described with respect to FIG. 1. The signaling diagram of FIG. 4 also indicates by a horizontal dotted line and marginal notations a division of the messages and operations for this embodiment between messages and operations performed prior to handover, and handover messages and operations.

Referring to FIG. 4, the pre-handover process begins with the MME generating a random authentication value designated as H_nonce (for "Handover Nonce") of a length equal to that of the KeNB key. As indicated by message 3, the MME then sends the H_nonce key to the UE, using known security protocols. In an exemplary case, the forwarding of the H_nonce key from the MME to the UE is protected by a NAS security. It is noted that at any initial and/or subsequent authentication using Authentication Key Agreement (AKA), the UE and MME create security contexts, including NAS encryption and NAS integrity keys.

When messages from the MME pass through one or more eNBs over the air interface to the UE, the eNBs cannot see the content of the NAS messages since neither the MME nor the UE share NAS keys with eNBs. As such, the random H_nonce key cannot be eavesdropped by eNBs in the transmission path during the transmission of message 3. Stated differently, the random H_nonce key is protected by NAS security to prevent the eNBs supported by the MME from learning the random handover nonce key, H_nonce. However, for the initial handover, from the original source eNB to the first target eNB, it is necessary that the original source eNB have access to the H_nonce key (as will be made clear from the discussion following), and accordingly, that key is sent from the MME to the original source eNB in message 2.

Once the pre-handover steps of (1) H_nonce selection by the MME and (2) forwarding of that key from the MME to the UE and the original source eNB have been completed, an example embodiment of a handover procedure for handing over the UE from the source eNB to a target eNB is performed as detailed below.

Still referring to FIG. 4, the UE sends a measurement report to the source eNB as indicated by message 4. As described in the background section with respect to FIG. 1, the measurement report is well-known in the art and thus, is not described herein for the sake of brevity. In response to receiving the measurement report, the source eNB makes a handover decision for the UE as indicated in operation 4A. As such, the source eNB determines which target eNB will provide communication services to the UE following the handover procedure. The source eNB then derives the second key KeNB* in operation 4B with a one-way function from the known KeNB, as described in the conventional method of FIG. 2.

The source eNB then sends a handover request to the target eNB in message 5. The handover request includes the H_nonce key and the KeNB* keys. It should be apparent to those of skill in the art that while the necessity to pre-store the H_nonce key with the original source eNB may somewhat mitigate the forward security enhancement of the invention for the initial handover (from the original source eNB to the first target eNB), all further handovers for the UE will obtain the full forward security enhancement of the invention. Hence, this invention guarantees forward security from the second handover.

The target eNB derives a new KeNB from KeNB* and H_nonce, received from the source eNB, along with an identifier for the target eNB, Target eNB_ID, in operation 6A. As will be readily understood by those skilled in the art of the invention, the Target eNB_ID value corresponds to, or can be derived from the Physical Cell ID, or PCI, for the particular eNB, the PCI being a globally unique number identifying the eNB within a particular wireless system. The target eNB then derives new RRC/UP keys from the new KeNB key in operation 6B. The target eNB sends a handover response to the source eNB, including its identifier, Target eNB_ID, in message 6.

As indicated by message 7, the source eNB then sends a handover command to the UE. The handover command of message 7 makes the target eNB known to the UE by including the identifier, Target eNB_ID, of the target eNB. As previously discussed, the UE has already received the random handover seed key H_nonce from the MME. Accordingly, the UE derives its own new KeNB key from KeNB*, H_nonce and Target eNB_ID in operation 7A. An exemplary algorithm for deriving the new KeNB key, both here and in operation 6A at the target eNB, is KeNB=HASH(KeNB*||H_nonce||Target eNB_ID), where HASH is a cryptographically-secure one-way function. From the derived new KeNB key, the UE derives new RRC/UP keys in operation 7B. Derivation of the RRC/UP keys are well-known in the art and thus, are not discussed herein for the sake of brevity.

Still referring to FIG. 4, the UE sends a handover confirm message to the target eNB as shown by message 8. This message is already protected by the new RRC keys. The target eNB receives the handover confirm message from the UE and, in message 9, notifies the source eNB that the handover is complete. Once the handover procedure is complete, the target eNB, which is now the new source eNB for the UE, sends a UE location update message to the MME, in message 10, in order to prepare for a possible second handover.

Figure 5:
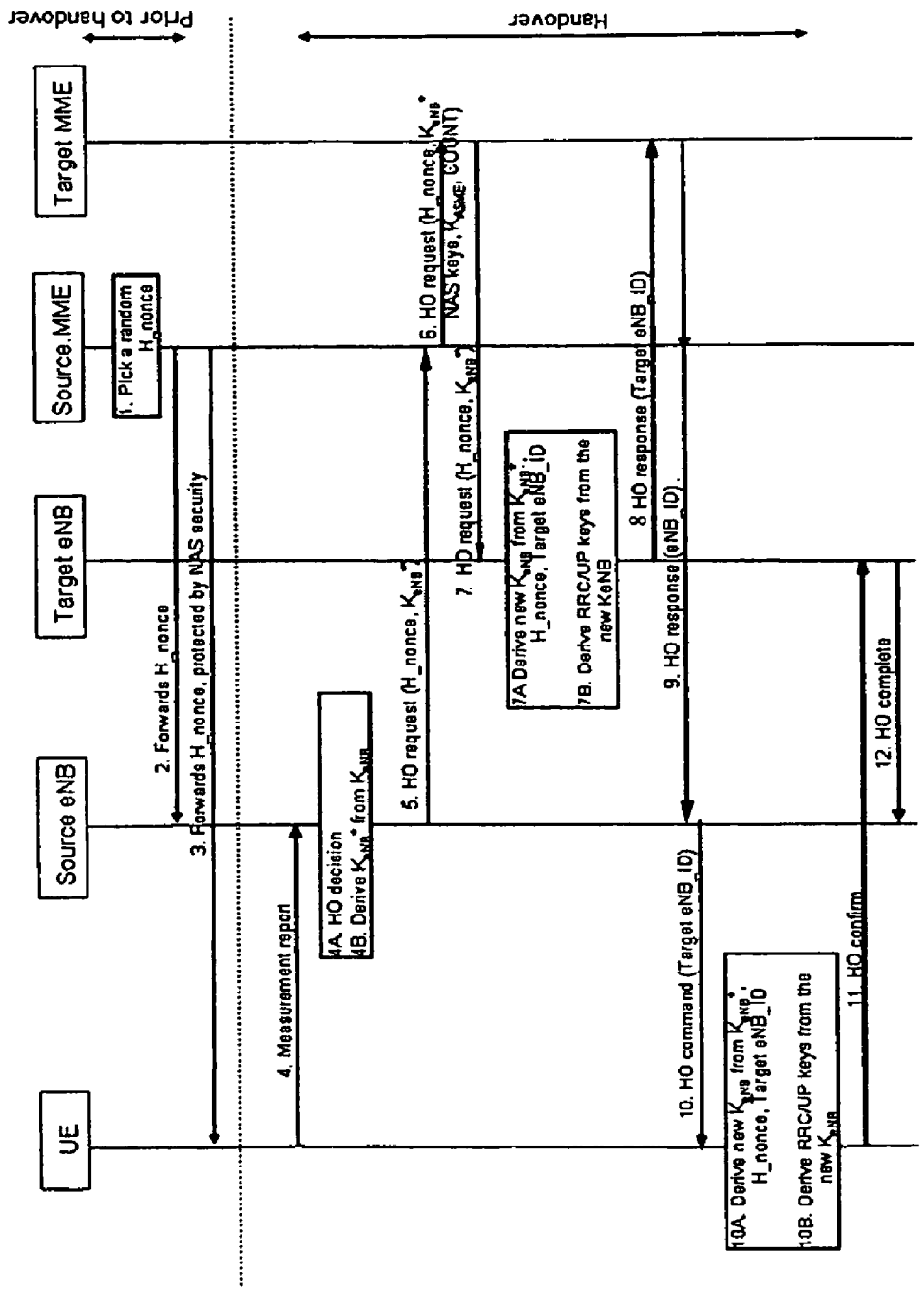
FIG. 5 illustrates a signal flow diagram for messages and operations of a Inter-MME handover procedure according to the alternative embodiment

While the alternative embodiment just described is directed to intra-MME handovers, it will be apparent to those skilled in the art that the same principles apply for an inter-MME handover, the primary difference being the intercession of the target MME between the source and target eNBs for certain of the signaling messages. A signaling diagram illustrating that message flow for the inter-MME handover case between a Source MME and Target MME is shown in FIG. 5. Like reference numerals are used to indicate elements that are substantially identical to the elements of FIGS. 4 and 5, and thus, the detailed description thereof will not be repeated except where necessary.

In an alternative embodiment, rather than passing a handover request to the target eNB, the source eNB sends a handover request to the Source MME in message 5. The Source MME forwards the handover request, including NAS keys; $K_{ASME}$, and NAS uplink COUNT, to the Target MME in message 6. The Target MME forwards the handover request to the target eNB in message 7. In steps 7A and 7B, the target eNB performs the processing described above with respect to steps 6A and 6B of FIG. 4. The target eNB sends a handover response to the Target MME in message 8, and the Target MME forwards this response to the Source eNB in message 9.

As indicated by message 10, the source eNB then sends a handover command to the UE. The handover command of message 10 makes the target eNB known to the UE by including the identifier, Target eNB_ID, of the target eNB. As previously discussed, the UE has already received the random handover seed key H_nonce from the MME. Accordingly, the UE derives its own new KeNB key from KeNB*, H_nonce and Target eNB_ID in operation 10A. An exemplary algorithm for deriving the new KeNB key, both here and in operation 7A at the target eNB, is KeNB=HASH (KeNB* ||H_nonce|| Target eNB_ID), where HASH is a cryptographically-secure one-way function. From the derived new KeNB key, the UE derives new RRC/UP keys in operation 10B. Derivation of the RRC/UP keys are well-known in the art and thus, are not discussed herein for the sake of brevity.

Still referring to FIG. 5, the UE sends a handover confirm message to the target eNB as shown by message 11. This message is already protected by the new RRC keys. The target eNB receives the handover confirm message from the UE and, in message 12, notifies the source eNB that the handover is complete.

Example embodiments being thus described, it will be obvious that the same may be varied in many ways. Such variations are not to be regarded as a departure from the example embodiments, and all such modifications are intended to be included within the scope.

We claim:

1. A method for secure wireless communication, the method comprising:
   receiving, at a user equipment, a handover nonce key protected by a secure protocol from a core component of a network, the secure protocol preventing the handover nonce key from being learned by base stations supported by the core component of the network;
   sending a measurement report to the source base station after the receiving, at the user equipment, of the handover nonce key from the core component of the network;
   receiving, at the user equipment, a handover command from a source base station, the handover command including a target base station identifier identifying a target base station, the target base station being a base station targeted to provide services to the user equipment that is supported by the source base station;

deriving encryption keys using the received handover nonce key and the target base station identifier; and communicating with the target base station based on the derived encryption keys and the target base station.

2. The method of claim 1, further comprising:

sending a confirmation message to the target base station to confirm handover from the source base station to the target base station is acceptable.

3. The method of claim 1, wherein the deriving step inputs the handover nonce key and the target base station identifier as inputs to a key derivation function to derive the encryption keys.

4. The method of claim 1, wherein the secure protocol is a non-access stratum (NAS) protocol.

5. A method for secure wireless communication, the method comprising:

sending a handover nonce key from a core component of a network to a user equipment using a secure protocol that prevents the handover nonce key from being learned by base stations supported by the core network component;

assigning a first handover key at the core component of a network to each base station supported by the core component; and providing the first handover key to each of a plurality of handover target base stations, the first handover key being different for each handover target base station and being provided prior to sending the handover nonce key to the user equipment.

6. The method of claim 5, wherein the providing step provides the first handover nonce to each of the plurality of handover target base stations prior to a handover procedure involving the plurality of handover target base stations.

7. The method of claim 5, further comprising:

receiving, at the core component of the network, a list of potential handover target base stations for the user equipment from a source base station currently supporting the user equipment;

selecting the handover nonce key;

deriving a second handover key specific for each target base station listed in the list of potential handover target base stations by using the handover nonce key and respective target base station identifiers as inputs to a key derivation function;

encrypting each second handover key with the corresponding first random key to obtain an encrypted second random key for each target base station listed in the list of potential handover target base stations; and sending a list of the encrypted second handover keys to the source base station.

8. A method for secure wireless communication, the method comprising:

sending a list identifying a plurality of potential handover target base stations from a source base station to a core component of a network to request information for each of the plurality of potential handover target base stations included in the list;

receiving a list of encrypted first handover keys from the core component of the network, each of the encrypted first handover keys being specific to one of the plurality of potential handover target base stations.

9. The method of claim 8, wherein a handover nonce key protected by a secure protocol is sent from the core component of a network to a user equipment, the secure protocol preventing the handover nonce key from being learned by a source base station currently supporting the user equipment and the potential handover target base stations supported by the core component of the network.

10. The method of claim 8, further comprising:

receiving, at the source base station, a measurement report from the user equipment;

selecting one of the potential handover target base stations as a target base station to support the user equipment following a successful handover;

forwarding a handover request to the target base station, the handover request including the encrypted first handover key corresponding the selected target base station;

sending a handover command to the user equipment, the handover command identifies the selected target base station;

receiving a handover complete signal from the target base station; and handing over support of the user equipment to the target base station in response to receiving the handover complete signal.

11. A method for wireless communication, the method comprising:

receiving a first handover nonce from a core component of a network, the network including a plurality of base stations one of which is a source base station supporting a user equipment and another of which is a target base station for supporting the user equipment after handover;

receiving a handover request at the target base station, the handover request including the handover nonce key and an encryption key for the target base station, wherein the first random key is received prior to a handover procedure started by receiving the handover request;

deriving a new encryption key and a target base station identifier identifying a target base station from the encryption key and the handover nonce key;

deriving additional encryption keys from the new encryption key for the target base station; and communicating the target base station identifier to the source base station using the derived additional encryption keys.

12. The method of claim 11, wherein the handover nonce key is protected by a secure protocol and is sent from the core component of the network to the user equipment, the secure protocol preventing the handover nonce key from being learned by the source base station currently supporting the user equipment and the target base station supported by the core component of the network.

* * * * *